United States Patent
Striegler et al.

(10) Patent No.: US 7,763,832 B2
(45) Date of Patent: Jul. 27, 2010

(54) COOK TOP COMPRISING A GLASS CERAMIC PLATE HAVING AN OPAQUE COATING AND AN IMPROVED WINDOW COATING ON A DISPLAY WINDOW ON AN UNDERSIDE OF THE PLATE

(75) Inventors: Harald Striegler, Ockenheim (DE); Dietmar Wennemann, Albig (DE); Annette Lukas, Rodenbach (DE)

(73) Assignee: Schott AG, Mainz (DE)

( * ) Notice: Subject to any disclaimer, the term of this patent is extended or adjusted under 35 U.S.C. 154(b) by 400 days.

(21) Appl. No.: 11/762,975

(22) Filed: Jun. 14, 2007

(65) Prior Publication Data
US 2007/0295711 A1 Dec. 27, 2007

(30) Foreign Application Priority Data
Jun. 16, 2006 (DE) .................. 10 2006 027 739

(51) Int. Cl.
*H05B 3/68* (2006.01)
(52) U.S. Cl. .................. 219/448.11; 219/460.1
(58) Field of Classification Search ... 219/443.1–468.2, 219/548; 428/210, 426; 501/14–19
See application file for complete search history.

(56) References Cited

U.S. PATENT DOCUMENTS

| 5,138,135 | A | 8/1992 | Husslein et al. |
| 6,043,171 | A | 3/2000 | Sieberst et al. |
| 6,515,263 | B2 | 2/2003 | Mitra et al. |
| 6,660,980 | B2 * | 12/2003 | Nagata et al. ............... 219/622 |
| 7,009,150 | B2 | 3/2006 | Wennemann et al. |
| 7,105,232 | B2 | 9/2006 | Striegler |
| 7,208,703 | B2 | 4/2007 | Shimatani et al. |

(Continued)

FOREIGN PATENT DOCUMENTS

DE 41 04 983 3/1992

(Continued)

OTHER PUBLICATIONS

L. B. Valdest: "Resistivity Measurements . . . " Proceedings of the IRE, Feb. 1954, pp. 420-427 (in English).

(Continued)

*Primary Examiner*—Sang Y Paik
(74) *Attorney, Agent, or Firm*—Michael J. Striker

(57) ABSTRACT

The cook top includes a colorless transparent glass ceramic plate, which is provided with an opaque coating extending over its underside, except that in at least one window area a window coating is provided on the underside of the glass ceramic plate area instead of the opaque coating. In order to optimize colored displays arranged under the at least one window area and to facilitate the use of capacitive touch sensors, the window coating is a burned-in noble metal preparation with an electrical surface resistance of 1 MΩ/□ and in the at least one window area the glass ceramic plate coated with the window coating has a transmission in a range from 1.0 to 21.0% and a light scattering in a range of from 0.0 to 1.0% for visible light with wavelengths of from 400 nm to 750 nm.

22 Claims, 6 Drawing Sheets

U.S. PATENT DOCUMENTS

| | | |
|---|---|---|
| 2002/0084263 A1 | 7/2002 | Wennemann et al. |
| 2004/0091718 A1 | 5/2004 | Striegler |
| 2005/0172829 A1 | 8/2005 | Shimatani |
| 2005/0224491 A1 | 10/2005 | Vilato et al. |
| 2007/0003769 A1 | 1/2007 | Striegler |
| 2007/0056961 A1 | 3/2007 | Shimatani et al. |

FOREIGN PATENT DOCUMENTS

| | | |
|---|---|---|
| DE | 197 21 737 | 11/1998 |
| DE | 299 02 875 | 9/1999 |
| DE | 200 19 210 | 1/2001 |
| EP | 0 296 312 | 12/1988 |
| EP | 0 438 656 | 7/1991 |
| EP | 1 043 294 | 10/2000 |
| EP | 1 170 264 | 1/2002 |
| EP | 1 206 165 | 5/2002 |
| EP | 1 264 806 | 12/2002 |
| EP | 1 267 593 | 12/2002 |
| EP | 1 364 924 | 11/2003 |
| EP | 4 416 227 | 5/2004 |
| EP | 1 435 759 | 7/2004 |
| EP | 1 505 354 | 2/2005 |
| EP | 1 770 071 | 4/2007 |
| JP | H7-17409 | 3/1991 |
| JP | 2003086337 | 3/2003 |
| JP | 2003297540 | 10/2003 |
| JP | 2003338359 | 11/2003 |
| JP | 2003338360 | 11/2003 |
| JP | 2004193050 | 7/2004 |
| JP | 2005090906 | 4/2005 |
| WO | 03/098115 | 11/2003 |

OTHER PUBLICATIONS

Guenther Landgraf: Gold in Decoration of Glass and Ceramics, in Gold, Progress in Chemistry, Biochemistry and Technology, John Wiley & Sons, 1999, p. 153.

Hollemann-Wiberg, Lehrbuch Der Anorganischen Chemie, 1985, 91-100, p. 103.

\* cited by examiner

COOK TOP COMPRISING A GLASS CERAMIC PLATE HAVING AN OPAQUE COATING AND AN IMPROVED WINDOW COATING ON A DISPLAY WINDOW ON AN UNDERSIDE OF THE PLATE

CROSS-REFERENCE

German Patent Application 10 2006 027 739.2-45 filed on Jun. 16, 2006 in Germany describes the invention described herein below and claimed in the claims appended herein below and provides the basis for a claim of priority for the instant invention under 35 U.S.C. 119. The disclosure of this German Patent Application is incorporated here by explicit reference thereto.

BACKGROUND OF THE INVENTION

1. The Field of the Invention

The present invention relates to a cook top comprising a colorless glass ceramic plate with a cooking surface on a top side thereof, which is provided with an opaque coating on an underside thereof, but which has at least one window area. The opaque coating is omitted in the at least one window area, which is provided with a special coating on the underside of the glass ceramic plate.

2. Related Art

Modern kitchens typically have a cook top with a glass ceramic plate providing a cooking surface. In order to prevent observation of parts of the cooking apparatus, such as the heating units, circuit boards, etc, which are under the cook top, which is undesirable for aesthetic reasons, typically the glass, from which the precursor glass plate to be ceramicized, also called the green glass plate, is made, is colored in the melt. Because of that it appears dark to black, when observed from above, which guarantees the required opacity.

When the glass is not colored in the melt, i.e. a transparent glass plate is made and it is ceramicized, predominantly high quartz-mixed crystals are formed, so that the glass ceramic plate is also transparent for visible light. In order to attain the required opacity the transparent glass ceramic plate is given an opaque coating on its underside in a known way, if necessary with an associated top decoration.

Modern glass ceramic cook tops have a window, in which the operation states or parameters, e.g. the selected heating stage and/or the residual heat in the cooking zones, are displayed by illuminating means. Also functional areas, with which the cooking zones can be turned on and off or the heating stage can be adjusted by touch, are usually found in the vicinity of the window or in the window itself. Touch is converted into an electrically signal by a so-called "touch sensor" under the glass ceramic.

The windows, under which touch sensors are arranged in addition to the illuminating means, are called "display or window areas" in the following disclosure.

So that the illuminating means (e.g. incandescent lamps, LEDs, LCDs or OLEDs) arranged under the glass ceramic plate behind the window area are easily read under the usual conditions in the kitchen, the glass ceramic plate must be sufficiently transparent in the region above the illuminating means, i.e. in the window area, for the wavelengths of the emitted light. This requirement prohibits an opaque topside decoration or opaque underside coating in the display areas.

Hence light impermeable opaque underside coatings as well as more economical topside decorations are left off of the area in which the display window is located, especially in glass ceramic-cooking surfaces made from colorless glass ceramic material.

The omission of a coating on a glass ceramic plate providing a cooking surface above a display device was described for the first time in 1991 in EP 0 438 656. The aim was to display the operating state of a cooking zone by means of an illuminated symbol (circle, line, or ring). The disclosure leaves open whether the coating is omitted from the top or bottom side of the glass ceramic.

EP 1 435 759 B1 describes the omission of a glass-based underside coating from a colorless glass ceramic plate providing a cooking surface. Similarly this possibility is mentioned in EP 1 267 593 B1 and in JP(A)2003 338 359.

In JP(A)2003 338 360 a two-layer glass-based opaque coating is provided, which comprises a first layer of lustrous paint and a second layer of an organic e.g. silicone-based coating. Both coatings must be omitted in the vicinity of the window area above the display device.

JP(A)2005 090 906 and WO/03 098 115 A1 disclose omitting a sputtered underside coating in order to provide a window area and improving the display quality by increasing the upper and underside antireflection layer.

According to DE 299 02 875 U1 the display device around a hot zone is formed by omitting parts of an underside, light impermeable coating on a dark colored glass ceramic plate providing a cooking surface so that e.g. only points or letters are observable instead of an illuminated ring.

While—like in the last named reference—with a colored glass ceramic plate providing a cooking surface, such as that marketed under the trademark CERAN SUPREMA®, no significant aesthetic properties are lost by removing the coating on its underside, with a colorless glass ceramic plate, especially when the display device is turned off, the interior of the cooking range can be seen through the window, because there the underside coating is removed. The observation of parts in the interior of the cooking range, for example circuit boards, is undesirable for aesthetic reasons.

A two-layer structure for the underside coating is thus disclosed in JP(A)2003 086 337, in which the first layer comprises an effect pigment, which is permeable for the light from the display device and the second layer comprises a light impermeable layer of a black pigment, e.g. Fe—Cr—Co Spinel. When only the second layer is omitted above the display device, the activated display device is clearly visible through the effect pigment layer, while the interior of the cooking range is sufficiently concealed by the effect pigment when the display device is turned off. The same device is disclosed in JP(A)2003 297 540.

However the underside coating of the display area with an effect pigment layer has the disadvantage that the effect pigment layer can easily crack or scratch because of the absence of the black covering layer during transport or assembly of the cooking range. Furthermore the light of illuminating means is noticeably scattered by the effect pigments, because the pigments are a few micrometers in size so that the display device does not have sharp edges and thus appears to be blurry. From FIG. 4 it is apparent that the fraction of the scattered light from this sort of window, like those in marketed cook tops, can amount to up to 30%. Because of the great scattering the illuminating devices are not clearly detectable. Display windows with effect pigment layers can thus be a safety hazard because their poorly readable displayed values in cases in which display devices that indicate the heating stage are arranged under them.

The light of the display device can even be scattered in the case of colored glass ceramic plates, e.g. by sufficiently large micro-crystallites in milky colored glass ceramic plates, which is disclosed in US 2005/0224491.

Often colored glass ceramic plates have nubs or bumps on their underside, which can lead to distortion of the display device. For that reason a smooth underside is produced in the display area according to the above-mentioned reference, as is also the case in DE 041 04 983 C1, to which a colorless silicone layer is applied.

According to the best known solution for providing a cook top comprising a transparent colorless glass ceramic plate with a window for a display device, which only weakly scatters light of the display device and prevents viewing the cooking range interior under the cook top, the underside coating of the glass ceramic comprises a noble metal preparation in the display area under the window.

Since the noble metal coating contains no pigments, it scatters very little visible light (wavelengths 400 to 750 nm). The scattering of the visible light amounts to 1 to 3% near this sort of window, so that the illuminating means under the window is comparatively clear. Curves a and b of FIG. 5 show, for example, the amount and behavior of the scattering for two different commercially obtainable glass ceramic plates providing cooking surfaces. FIG. 6a shows a segmented display in the window of a commercial glass ceramic plate providing a cooking surface. At the same time the ability to observe the interior of the cooking unit has been sufficiently greatly limited by the primarily black-brown noble metal coating, which has a transmission for visible light of about 0 to 45% (curve a, FIG. 7).

The noble metal coating has a very small electrical conductivity. Its surface resistance is around 1 M$\Omega$/□. Because of that not only illuminating means but also touch sensors, which operate on a capacitive principle, can be arranged under the noble metal coating and operated. Touch sensors, which operate according to a capacitive principle, are currently used in current cooking ranges. It is common to arrange the sensors in the vicinity of the window as well as the illuminating means and to form the display area in this way.

The mechanical strength of the noble metal coating is sufficient for transport, assembly, and operation of the cook top.

The transmission curve a in FIG. 7 shows that known noble metal coatings are nearly impermeable for violet light (only about 0.6% transmission at 400 nm), while they transmit red light well (about 20 to 45% transmission at 700-750 nm).

Since the known noble metal coatings nearly completely block light of wavelengths 400 to 450 nm, they have the disadvantage that they are unsuitable for violet or dark blue illuminating devices. Because the known noble metal coatings have greatly varying transmittances for visible light, which has wavelengths from 400 to 750 nm, they are hardly suitable for multi-color displays, i.e. displays that use many different color shapes for display of information. When the known noble metal coatings are used to form the window for a multi-color display, the display may appear imbalanced in regarding to the intensities of the individual colors because of the wavelength dependent varying transmission of these noble metal coatings. However multi-color displays or also elegant dark blue displays will be more frequently used in glass ceramic plates providing cooking surfaces in the future because of the increasing diversity of electronic functions.

Because of the reduced transmission of the currently used noble metal coatings in the concerned wavelength range of 400 to 450 nm information displayed in violet or dark blue cannot be observed or only observed with reduced light intensity, while information displayed in red (700 to 750 nm) is observed to be extremely intense and correspondingly bright. The difference in the intensities of the designated colors, especially the intense red, for which the human eye is most sensitive, could produce an unpleasant impression during operation of the cook top.

The color shades could either be produced by light sources, which emit their respective wavelengths or elegantly by additive color mixing of the primary spectral colors red, green, and blue. The term "color shades" means the entire color palette from violet (400 nm) through blue (450 nm), green (550 nm), yellow (600 nm), orange (650 nm) until at red (700 nm) and dark red (750 nm) according to Hollemann-Wilberg, Lehrbuch der Anorganishcen Chemie (Textbook of Inorganic Chemistry), 91-100. Edition, Walter de Gruyter, Editor, Berlin, 1985, p. 103). The currently used noble metal coatings impair the display of colored information in both processes.

An additional disadvantage of the window of the commercial glass ceramic plates providing a cooking surface is that the display has very small dark areas or spots (FIG. 6a, FIG. 10). Because of that the illuminated segments of the e.g. seven part display appear to be spotted. It is very desirable that an illuminating means arranged under the glass ceramic plate uniformly illuminated the window area, especially in the case of expensive high quality cooking surfaces.

In summary the known solution for coating a window area or display area provided on a colored, transparent, smooth-surfaced (especially both sides) glass ceramic plate does not provide satisfactory uniform light transmission in the visible range and does not provide acceptable clarity of displayed information produced by a display device below the window area.

SUMMARY OF THE INVENTION it is an object of the present invention to provide a window or display area on a colorless, transparent glass ceramic plate that provides a cooking surface of a cooking device
which has a transmission for visible light in a wavelength range of 400 to 750 nm that is as large and as uniform as possible,
through which illuminating devices under the glass ceramic plate can be clearly seen,
by which at most 3% of the light of the illuminating devices is scattered so that displays and other signaling devices in the assembled cook top may be clearly and distinctly observed (not blurry),
which is sufficiently transparent so that illuminating means shine sufficiently brightly through the glass ceramic-cooking surface,
which is still sufficiently opaque so that the interior of the cooking range or apparatus is sufficiently concealed,
which is resistant to mechanical loads (scratching or cracking), and
which allows touch sensors that operate by a capacitive principle to be arranged in the window area under the glass ceramic plate.

These objects and others, which will be made more apparent hereinafter, are attained in a cook top comprising a colorless transparent glass ceramic plate with a cooking surface on a top side thereof, which is provided with an opaque coating extending over an underside thereof, except that in at least one window area a window coating is provided on the underside of the glass ceramic plate in place of the opaque coating.

According to the invention the window coating comprises a burned-in noble metal preparation with an electrical surface resistance over 1 M$\Omega$/□ and in the at least one window area the glass ceramic plate with the window coating has a transmission in a range from 1.0 to 21.0% for visible light with wavelengths of from 400 nm to 750 nm and a light scattering in range of from 0.0 to 1.0% for visible light with wavelengths of from 400 nm to 750 nm.

Preferred embodiments are claimed in the dependent claims provided herein below and are described in the detailed description of the invention, with reference to the appended figures.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
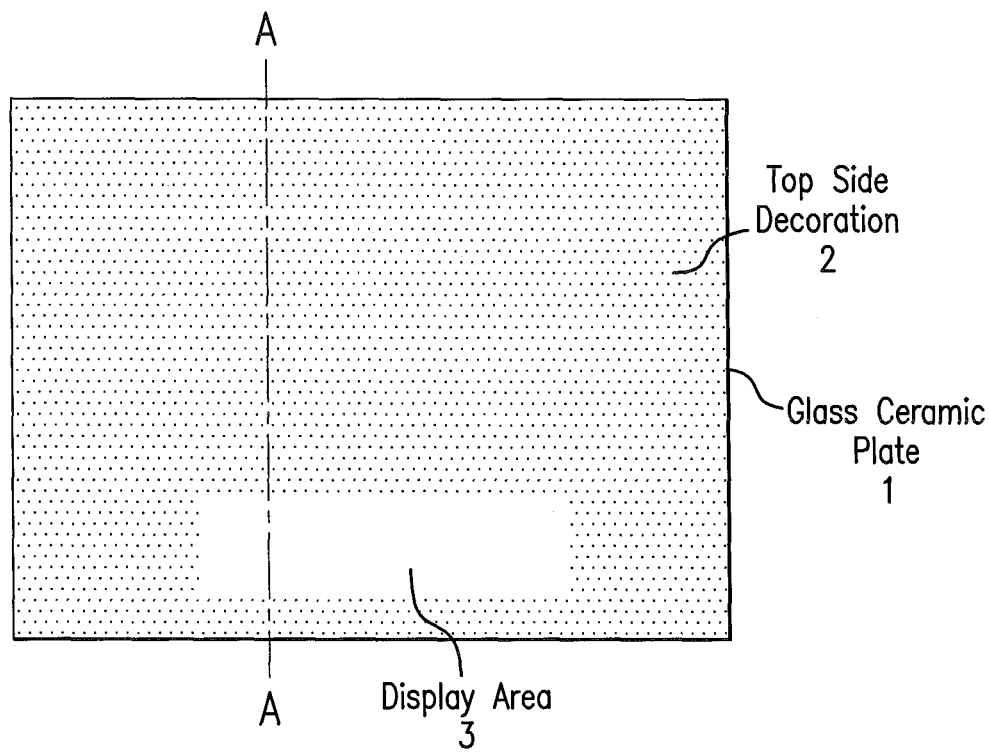
FIG. 1 is a top plan view of a cook top comprising a glass ceramic plate with a rectangular coated window area for a display device according to the invention.

FIG. 1 shows a glass ceramic plate 1 with a cooking surface decorated on its topside with a pattern of spots or points, which has a display or window area 3. The topside decoration 2 for example comprises a glass flux-based ceramic paint in a known manner.

Figure 2:
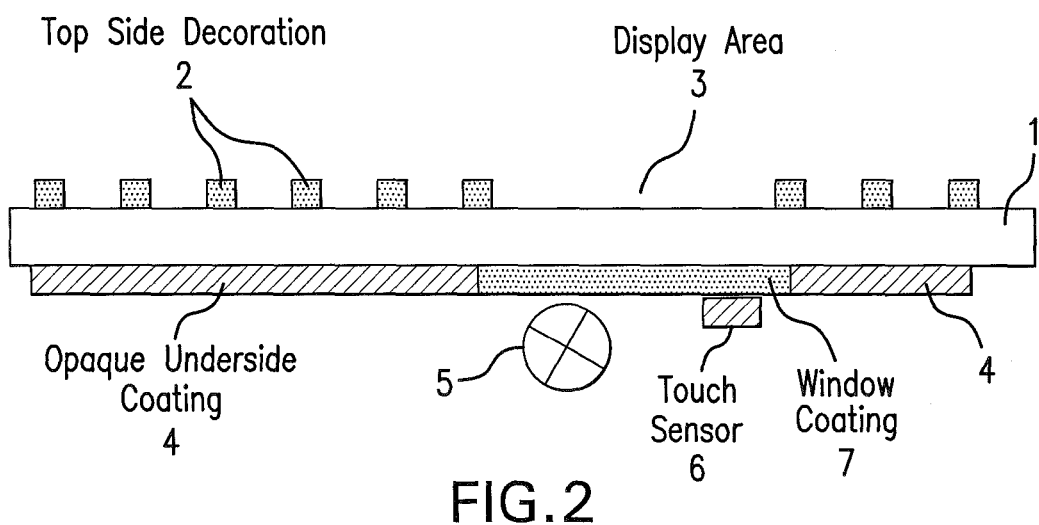
FIG. 2 is a schematic cross-sectional view through the cook top with the window area according to FIG. 1, which is taken along the section line A-A in FIG. 1.

As shown in the cross-sectional view according to FIG. 2, the glass ceramic plate 1 is provided with an opaque underside coating 4, i.e. a coating 4 that extends over and covers the underside of the glass ceramic plate 1, except in the display or window area 3. The window area 3, under which a lighting device 5 for a display is indicated symbolically and a so-called touch sensor 6 is arranged, is provided with a special noble metal coating 7 according to the invention on the underside of the glass ceramic plate in the window area 3 in place of or instead of the opaque coating 4.

Noble metal coatings have a very high electrical conductivity, i.e. a small electrical surface resistance $R_{sq}$, which is in a range from about 1 to 10 ohm per square. Because of the high electrical conductivity the integration of the touch sensor, which operates according to a capacitive principle, is not possible in the display area. It would be possible only for sensors operating according to an optical or piezoelectric principle. However in current cooking ranges capacitive touch sensors are standard and it is conventional to arrange these sensors beside the lighting device in the display area. Thus there is a need to assembly touch sensors operating according to a capacitive principle in the display area coated according to the present invention.

However the troublesome electrical conductivity of the noble metal coating can be reduced by addition of base metals, especially by addition of silicon or bismuth (Günter Landgraf: Gold in Decoration of Glass and Ceramics, in "Gold: Progress in Chemistry, Biochemistry and Technology", 1999 John Wiley & Sons (editors), p. 153 f). This conductivity reducing effect is especially used for making of noble metal decorations for microwave utensils, in which the electrical surface resistance must be in a kilo ohm range or mega ohm range, so that no spark generation occurs when using the utensils in the household microwave unit.

Experiments with noble metal preparations for microwave utensils ("Microwave preparations"), which are described in EP 0 296 312 B1 and EP 1 043 294 A1, show that noble metal coatings with high electrical resistance are in principle suitable for the underside coating of a glass ceramic plate that provides a cooking surface. However experiments with a display area of about 30 cm×5 cm have also shown that the surface resistance of typical microwave preparations, e.g. GGP 2531 ("Microwave gold" from HERAUS), can clearly significantly vary from the kilo ohm range to the mega ohm range and that the surface resistance can be reduced into the low kilo ohm range when the coating is cleaned with a paper towel. However a capacitive touch sensor in which the surface resistance is in the kilo ohm range does not operate.

Then so that the operation of the current touch control units, e.g. products of the E.G.O. firm, operating according to the capacitive principle, is guaranteed, the electrical surface resistance of the burned-in noble metal coating must still be a thousand times higher than in conventional noble metal decorations for microwave utensils; it must be in the gigaohm range, also over $10^9 \Omega/\square$. This sort of noble metal coating with the most extremely small electrical conductivity (high surface resistance) can be successfully manufactured by modification of the composition of known microwave preparations (noble metal paint for microwave utensils) and of course by additionally increasing the oxide form components above the conventional amount, e.g. 10 to 15% by weight oxide formers, in relation to the total amount of the burned-in noble metal film, and especially by the use of silicon or bismuth as oxide former. The proportion of the oxide formers, especially silicon and bismuth, must be at least 15% by weight, better in a range from 20 to 40% by weight, in relation to the total amount of the burned-in noble metal film. Besides alloyed noble metal the most finely divided metal oxides, especially silicon dioxide and bismuth oxide, arise during the burning in of the noble metal preparation, i.e. display paint, with this sort of elevated oxide former proportion. The finely divided metal oxides surround or encase the noble metal particles, which are then electrically insulated from each other, so that this sort of layer or coating has an extremely small surface conductivity, i.e. an extremely high surface resistance in the megaohm range to gigaohm range. Generally oxides of metalloids or oxides of base metals are suitable for this purpose.

The burned-in display paint becomes a metallic black, platinum gray, black-brown to golden brown, yellow-red to copper colored coating according to the type and amount of the noble metals in the paint composition. Also the coating thickness of the noble metal film has an influence on the color of the coating. The color of the coating can also be influenced by addition of further metals or metalloids in the form of organic compounds to the noble metal preparation, e.g. nickel, chromium, or zirconium, but also aluminum, antimony, barium, boron, calcium, cerium, iron, cobalt, germanium, tantalum, tin, titanium, vanadium, manganese, strontium, molybdenum, ruthenium, indium, tungsten, osmium, iridium, rhodium, or zinc. Using metals known as adherent further increases the wear resistance or abrasion resistance.

Surprisingly it has been shown that colorless, transparent glass ceramics, which are coated with this sort of noble metal preparation, definitely have a lower transmittance for red light and a higher transmittance for violet and dark blue light than glass ceramics with a conventional noble metal coating in the window area, if the noble metal coating is totally free of iron oxide or titanium dioxide or contains less than 1% by weight of iron oxide and less than 1% by weight of titanium dioxide, in relation to the burned-in noble metal coating.

The metals are present in the noble metal preparation, the display paint, as soluble organic compounds, preferably as resinates or sulforesinates. The display paint requires sufficient oxygen during burning-in, so that the organometallic compounds can be completely consumed and the oxide network can be completely formed. The oxygen can be supplied during the burn-in as air or can be chemically released, e.g. from a peroxide. Maximum temperatures of 400 to 1200° C., especially 800 to 850° C. are necessary for obtaining optimum adherence and scratch resistance.

Metal resinates and sulforesinates are a suitable choice for the organometallic compounds. A screen-printable noble metal paste can be made with a solvent, which can be applied to the display area by screen-printing using a 140-31 mesh screen as a full surface coating with a surface coverage of 100%.

For example, a silvered cooking surface with a black display area can be made very simply and economically, when a colorless glass ceramic plate with a cooking surface that is already decorated with conventional enamel paint is coated on its bottom side with a noble metal preparation GPP 4510/S except in the display area. After the noble metal preparation GPP 4510/S applied to the glass ceramic plate is dried according to its feel or touch the display area is coated with display paint GPP 010106. After burning in the noble metal paint printed on the underside of the glass ceramic panel produces a black coating on the display area and a silver coating on the remaining surfaces. The burning in of both paints can also occur separately, but the joint burning in of both paints is normally more economical.

Glass ceramic material with a $Li_2O$—$Al_2O_3$—$SiO_2$ composition is especially suitable as a substrate material for the glass ceramic plate to be coated according to the invention. An example is the colorless glass ceramic according to EP 1 170 264 B1 with a thermal expansion coefficient of $-10 \cdot 10^{-7}$ $K^{-1}$ to $+30 \cdot 10^{-7}$ $K^{-1}$ in a temperature range of 30 to 500° C., whose known composition, among others, is given in the following Table I.

TABLE I

COMPOSITION OF SUITABLE GLASS CERAMIC SUBSTRATE, in % by weight

| | Source: | |
|---|---|---|
| | EP 1 170 264 B1 Claims 14-18 | JP(A) 2004-193050 |
| $SiO_2$ | 66-70 | 50-80 |
| $Al_2O_3$ | >19.8-23 | 12-30 |
| $Li_2O$ | 3-4 | 1-6 |
| MgO | 0-1.5 | 0-5 |
| ZnO | 1-2.2 | 0-5 |
| BaO | 0-2.5 | 0-8 |
| $Na_2O$ | 0-1 | 0-5 |
| $K_2O$ | 0-0.6 | 0-5 |
| $TiO_2$ | 2-3 | 0-8 |
| $ZrO_2$ | 0.5-2 | 0-7 |
| $P_2O_5$ | 0-1 | 0-7 |
| $Sb_2O_3$ | Usual amt. | 0-4 |
| $As_2O_3$ | Usual amt. | 0-2 |
| CaO | 0-0.5 | 0 |
| SrO | 0-1 | 0 |

The coating of the display area with the noble metal preparation can also occur by other processes besides screen-printing, e.g. by spraying and stamping processes. In principle it is also possible to apply the noble metal film in the display area by sputtering. However the masking technology required in sputtering or spraying methods has production engineering disadvantages.

Extreme layer thickness fluctuations and thus appearance variations in transmission and also in the brightness of the display device can be kept to a minimum, when the display paint is processed under definite conditions, especially with constant temperature. The concentration of the display paint during the screen-printing process by evaporation of the solvent can be avoided by preferred selection of a high boiling solvent.

The coating thickness of the noble metal coating can be reduced so that the transmission is increased by dilution of the preparation or, in the case of application of the coating with a screen-printing process, by use of a finer screen mesh. The coating thickness can be adjusted so that the transmission of the coated glass ceramic for light from the current display devices (e.g. the display devices of E.G.O.) is sufficient, but that observation of the parts, such as the cables, in the interior of the cooking range is still not possible. The above-described noble metal coating fulfills both requirements for the transmission of the coated glass ceramic plate when the transmission of the coated glass ceramic for visible light, i.e. light with wavelengths in a range from 400 to 750 nm, is from 1.0 to 21%. When the transmission is less than 1.0% the current display devices are no longer sufficiently visible in practice in conventional lighting conditions. However when the transmission is greater than 21%, then the parts of the range in the interior, such as the cables, circuit board, among others, can be seen through the glass ceramic plate. The noble metal coating has a suitable transmission with conventional coating thickness of 150 to 250 nm. The known noble metal coatings for glass ceramic plates that provide cooking surfaces have an approximately doubled coating thickness of 300 to 400 nm in the display area. The smaller coating thickness of the coating according to the invention provides an economical advantage because less noble metal is consumed.

The light of the display device is only insignificantly scattered by a noble metal coating with the described composition in the window area. The fraction of light scattered is clearly under 1%. The noble metal coating is free of particles at which the light can be scattered in a troublesome manner (e.g. pigments or crystallites with a grain size in the micrometer range). The structure analysis (FIG. 3) shows the present of crystallites in the coating with a size under 150 nm (usually with a size in a range of 10 to 60 nm), which obviously does not lead to observable scattering because the small size of the crystallites is clearly under the wavelength of the transmitted light, i.e. 400 to 750 nm.

Figure 6A:
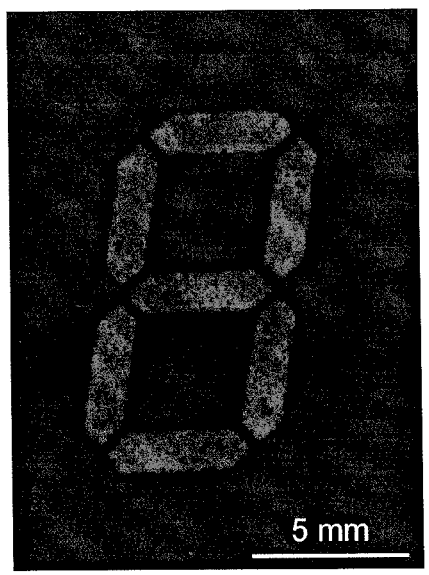
FIGS. 6a and 6b are respective light microscopic pictures of a display device (a) of a commercially obtainable glass ceramic plate providing a cooking surface and of a display device (b) of a glass ceramic plate of the invention with a noble metal preparation GPP 010106 according to FIG. 3 applied to the underside of the glass ceramic plate and burned-in to the glass ceramic plate.
Figure 9A:
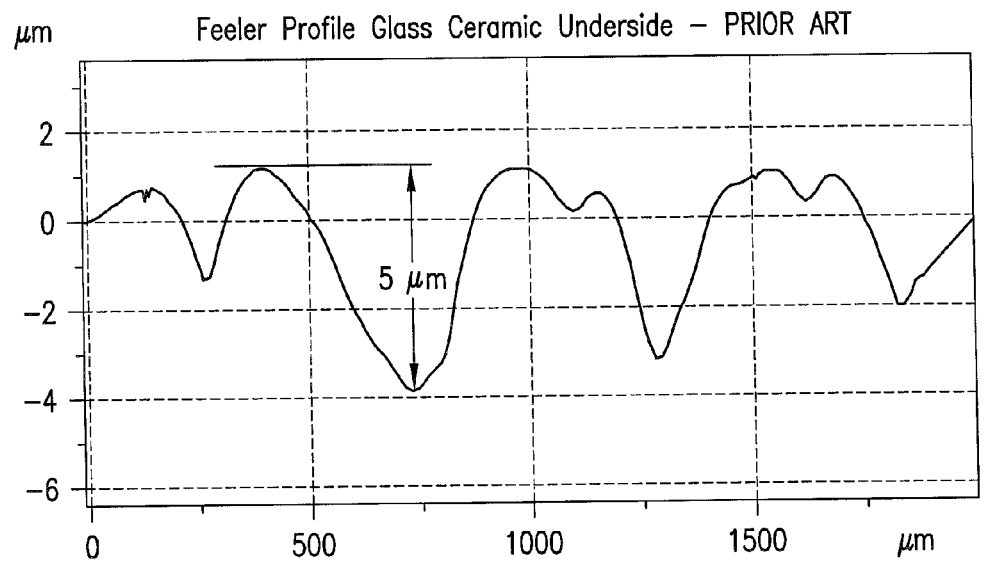
FIGS. 9a and 9b are graphical illustrations of unfiltered primary profiles of the glass ceramic undersides in the window area of (a) a commercially obtained glass ceramic plate providing a cooking surface and in the window area of (b) a glass ceramic plate of the present invention, measured with a feeler apparatus "Alpha step 200" of TENCOR INSTRUMENTS.

However besides the requirement that the noble metal coating must not scatter a significant amount of visible light the glass ceramic plate must be sufficiently smooth so that the lighting devices arranged under the glass ceramic plate appear uniformly bright with darker areas or regions (FIG. 6a). Otherwise the noble metal preparation applied to the underside of the glass ceramic plate flows into the depressions in the glass ceramic surface and produces local areas or regions in which the thickness of the noble metal film is greatly increased. Darker regions, which appear in the display area as flecks or spots, occur at these places in the display device. Depressions or indentations of up to 5 μm (FIG. 9a), with a width of about 250 μm and a length of about 300 μm were found in the vicinity of the window area in glass ceramic plates, which are used to make known cook tops. Depressions or indentations of 1 to 5 μm with a lateral dimension of more than 100 μm characterize the condition of the underside of the glass ceramic plate in the window area of these known cook tops.

Figure 6B:
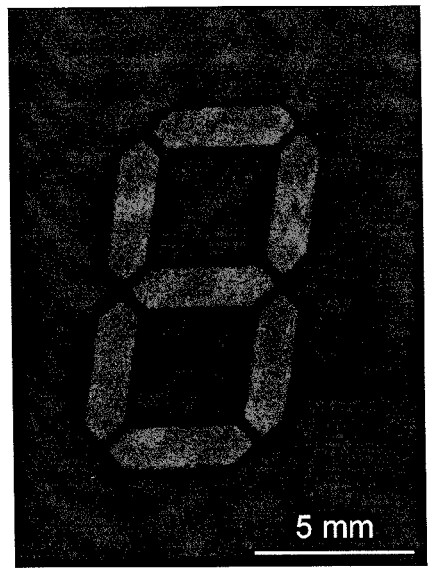
Figure 9B:
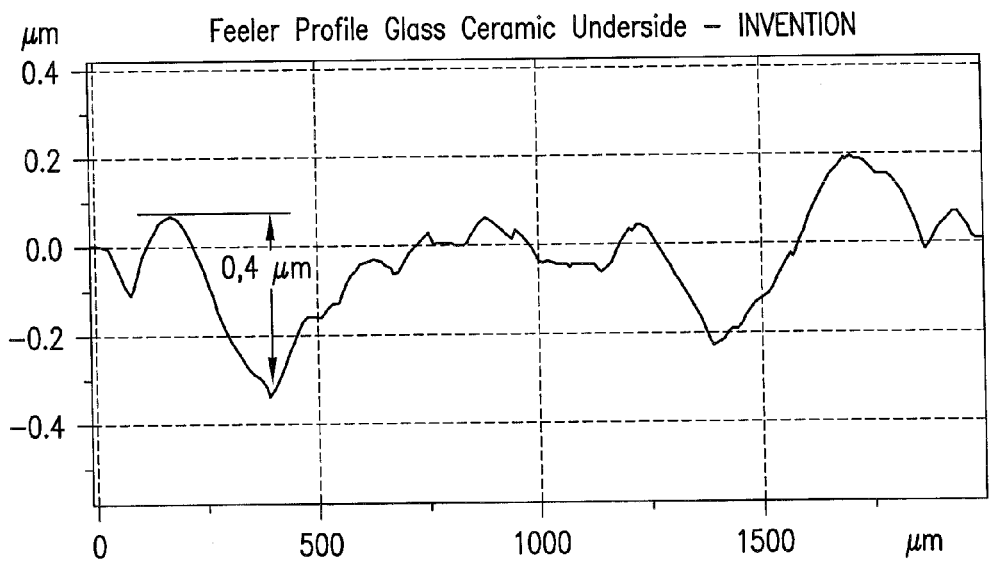
Figure 10:
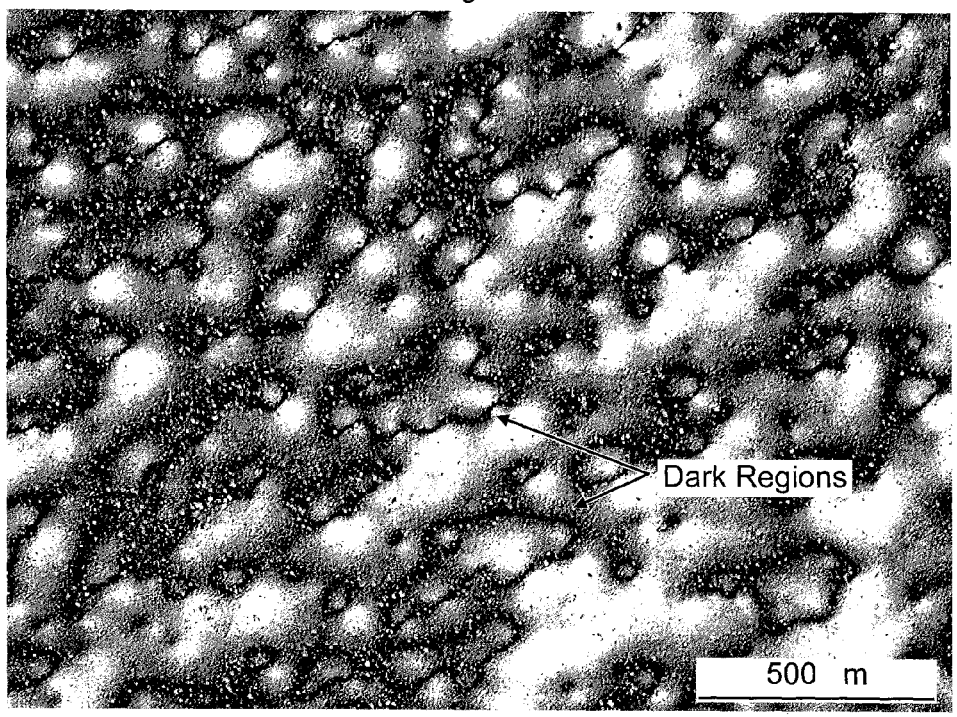
FIG. 10 is a light microscope picture of a noble metal coating in the window area of a commercially obtainable cooking surface with dark regions.

The window area of the glass ceramic plate is uniformly transparent when the roughness of the glass ceramic surface is less than $R_a$=0.3 μm, especially less than $R_a$=0.2 μm (measured with the help of DIN EN ISO 4287). The inevitable depressions present in the underside of the glass ceramic plate are less than 200 μm long, 50 μm wide, and 1.0 μm deep, especially less than 0.5 μm deep. FIG. 6b shows the same display device as in FIG. 6a with the only difference being that the display device is observed through a sufficiently smooth glass ceramic plate surface, which is provided with the noble metal coating according to the invention. FIG. 9b shows the associated feeler or touch profile of this smooth glass ceramic surface. The segments of the display device appear considerably more uniform than with the known glass ceramic surface with the rougher underside.

The remaining properties of the noble metal-containing coatings are sufficient. The coatings do not lower the strength of their glass ceramic substrates because of their small thickness. The impact resistance was tested with an impact strength testing unit according to DIN EN 60335. The average bending strength [DIN EN 1288-5(R45)] is over 110 MPa. The heat resistance is extremely good (a permanent load of 300 to 500° C. can be withstood) because of the oxidic composition and the chemical inertness of the noble metals gold, platinum, and palladium. Furthermore the coatings have sufficient resistance to condensed moisture or food fat. No discoloring of the coatings was observed from above the cook top when they were wet with oil.

Furthermore the noble metal coatings are definitely more scratch resistant than the effect pigment coatings described above in spite of their small thickness. No relevant damage could be produced in the burned-in noble metal coatings with a rounded metal tip (curvature radius 0.5 mm), which was loaded with 400 g. The scratch track of the metal tip was not visible from above on the built-in cook top. The porous effect pigment coating according to JP(A) 2003 086 337 could not withstand the same load.

The resulting noble metal coatings are thus suitable for the underside of the display area. They differ from the noble metal coatings of JP H7-17409, above all, because of their extremely high surface resistance and their adjusted transparency.

The resulting noble metal coatings differ from other known noble metal coatings, which are used in known cook tops, by their high transparency for violet light and the clearly smaller transparency for red light together with the smaller differences in their transparency for visible light over the entire wavelength range from 400 to 750 nm. The resulting noble metal coatings are thus better suited for making of cook tops that provide cooking surfaces, which information displayed by a multicolored display.

Furthermore the above-described glass ceramic plate that provides a cooking surface, which has window areas provided with a noble metal coating according to the invention, scatters light of the lighting device still less than the currently known window areas of the commercially obtainable cook tops. The illuminating device under the window area according to the invention appears more uniformly bright in contrast to those in the known cook tops.

In principle a cook top can be manufactured, in which the display paint is printed so that it fully covers, or is printed in patterns (e.g. a uniform arrangement of points or lines) on, the entire surface on the underside of the glass ceramic plate providing the cooking surface and is combined with other coatings. For example, the underside of the glass ceramic plate can be coated with other noble metal paints, e.g. the already mentioned silver noble metal preparation GPP 4510/S, lacquers based on organic polymers, such as silicones, polyamides, polyimide, etc., sol-gel points or ceramic paints (also applied on the topside of the glass ceramic plate).

Thus display paint can be applied to completely cover the display area on the underside of the glass ceramic plate providing the cooking surface in a single screen-printing step and a point pattern (or any arbitrary pattern) can be applied in the remaining areas. If the underside of the glass ceramic plate is then coated with GPP 4510/S ("silver noble metal paint") up to the display area coated with the display paint after drying of the display paint, the cooking surface appears to be dark in the display area and silver with black spots or dots in the remaining areas after burning both noble metal preparations into the underside of the glass ceramic plate. Similar cooking surfaces could be obtained by burning in the paints one after the other when both paints are incompatible. Because of the small coating thickness of the noble metal film the adherence and the baking were completely satisfactory. After baking the coating thickness in the region where both metal films overlap was 250 to 400 nm.

Multicolored displays may be arranged in the display area of this sort of cooking surface. Capacitive operating touch sensors can also be provided in display area for control of the functions of the cooking unit.

The described noble metal coatings are definitely superior to colored plastic foils and coatings based on organic materials (e.g. polyurethane, silicones, and epoxide resin lacquers) in regard to mechanical resistance, chemical resistance, and heat resistance. These types of lacquers, which can contain organic pigments (azopigments, polycyclic pigments), carbon black pigment, inorganic pigments, or nanoparticles, are used for coatings of window areas in operator control panels of ovens, microwave units, dish washers, or other household electrical appliances, in order to prevent observation of the interiors of the appliances.

TESTING METHODS

Measurement of Surface Roughness

To determine the surface roughness according to DIN EN ISO 4288 with an optical method (MicroGlider® unit FRT) 5 profiles were measured with the feeler unit over a distance of 5.6 mm and the roughness values were calculated with the associated standard deviations from this profile data according to DIN EN ISO 4288.

Measurement of the Transmission

Figure 8A:
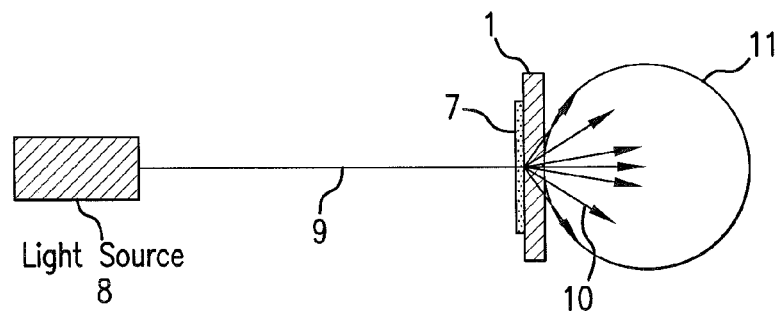
FIGS. 8a and 8b are diagrammatic illustrations of measurement arrangements for measuring the transmission and scattering respectively.

A sample 1, 7 for testing was arranged in accordance with FIG. 8a in the path of the light rays of incident light 9 from a light source 8. A ball-shaped or spherical detector 11 was arranged to detect the light 10 passing through the sample 1, 7. The transmission $T_i$ was calculated from the following formula $$T_i = \phi_{ex}/\phi_{in} \quad (1),$$

in which $\phi_{ex}$ is the light intensity of the light 10 passing through the sample and fin is the light intensity of the incident light 9.

Measurement of the Scattering

Figure 8B:
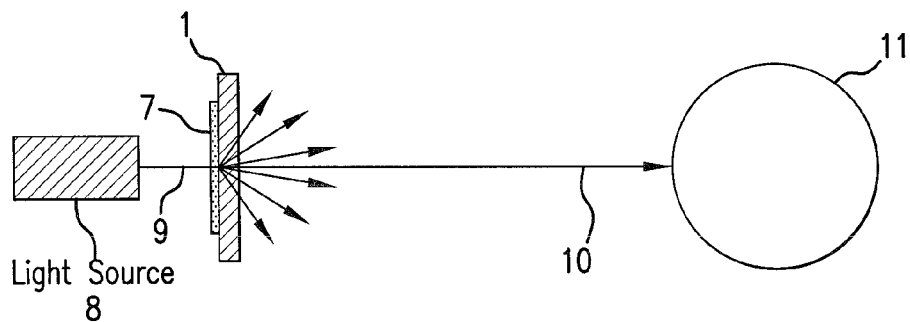

First the transmission measurement according to the measurement geometry shown in FIG. 8a was performed, in which the total light $T_i$, which passed through the sample 1, 7, was detected for determination of the light scattering. In a further measurement with the measurement geometry according to FIG. 8b, in which the distance of the sample 1, 7 to the ball-shaped detector 11 is comparatively large (50 cm), only the transmitted light $T_{ger}$ was detected, which was not deflected by the sample, i.e. which was not scattered. The portion S of the light that was scattered was calculated by subtraction of both transmitted light measurements, i.e.

$$S = T_i - T_{ger} \quad (2).$$

Measurement of the Electrical Surface Resistance (Ohm/Square)

The area, in which the electrical surface resistance of the noble metal coating lies, was measured sufficiently exactly with an Ohmmeter, when both electrodes of the measuring unit spaced as closely as possible to each other, i.e. with about 0.5 to 1 mm spacing, were placed on the coating. The resistance displayed on the measuring unit was equal to the surface resistance to a good approximation.

The exact measurement of the electrical surface resistance occurred according to the method of Valdes (L. B. Valdes, Proc. IRE, February 1954, pp. 420-427), in Which a measurement head with four equidistant measuring tips (spacing a), which are arranged linearly, is used. The two outer measuring tips apply a constant current, while a voltage drop is measured with a high ohm electrometer by means of the two inner measuring tips. Then assuming that the coating thickness d is negligible (d<<a) and the coating extends widely laterally (w>>a) the surface resistance $R_{sq}$ can be calculated from the voltage U and the current I by the following formula:

$$R_{sq} = (\pi/\ln 2) \cdot (U/I) = 4.539 \cdot (U/I) \quad (3).$$

EXAMPLE

Black Display Paint (with Small Electrical Conductivity)

The top side of a smooth (both sides were smooth) colorless glass ceramic plate 1 (about 60 cm deep, 80 cm wide, and 4 mm thick) having a composition according to EP 1 170 264 B1 (Table I, left column) was coated with a ceramic decorative paint according to DE 197 21 737 C1 in a regular point pattern up to a rectangular window area 3 for the display. The coated glass ceramic plate 1 was then ceramicized.

Subsequently the commercially obtained noble metal preparation GPP 4510/S (HERAUS, Hanau) was applied to the underside of the ceramicized glass ceramic plate by means of screen-printing (140-31 mesh), except that the display area 3 was left uncoated. This coating 4 was dried for about 3 hours at 20° C. Then the display area 3 was coated with noble metal preparation GPP 010106 (HEREAUS, Hanau) also by screen-printing (140-31 mesh) to form the window coating 7 in the display area. The noble metal preparations were burned-in for one hour at 830° C.

The finished cooking surface has a black appearance in the display area and a silver coating on its underside in the remaining areas.

The black noble metal film in the display area comprises, in weight percent, 40 to 60% gold, 10 to 20% platinum, 5 to 20% silicon dioxide, 5 to 20% bismuth oxide, 0 to 10% nickel oxide, chromium oxide and zirconium oxide.

Figure 3:
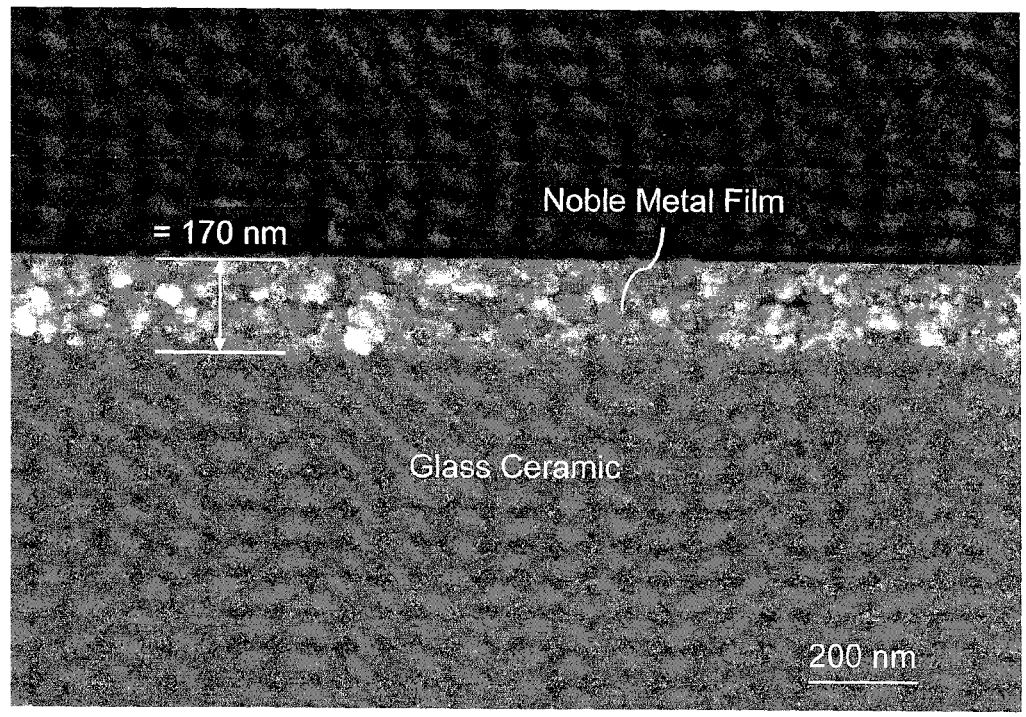
FIG. 3 is a cross-sectional view through a black underside coating of high electrical surface resistance according to the invention, which was made from the noble metal preparation GPP 010106 of HERAUS, Hanau.
Figure 4:
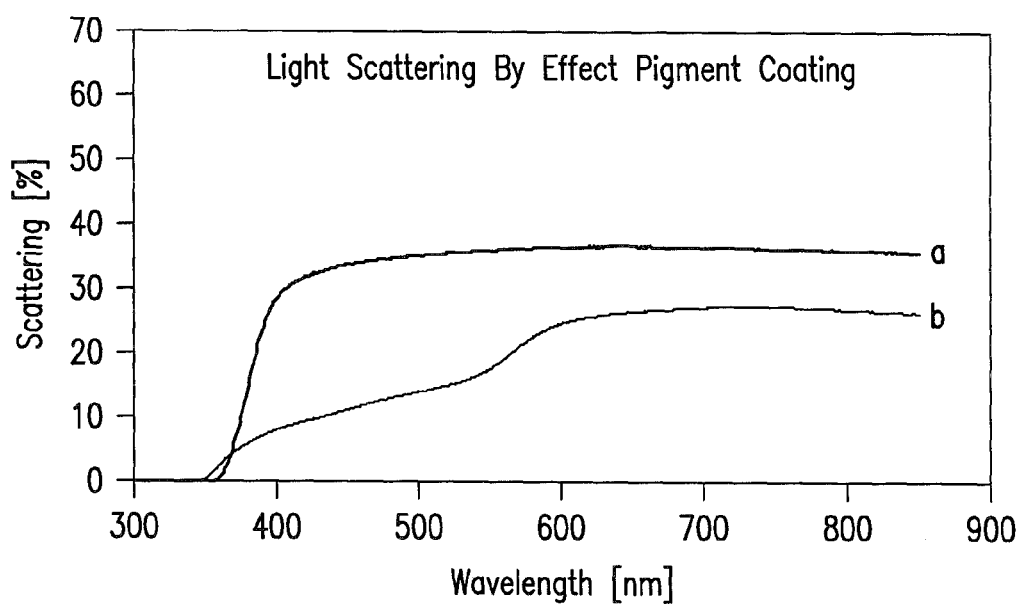
FIG. 4 is a graphical illustration showing the wavelength dependencies of respective fractions of light scattered by corresponding glass ceramic plates (a) and (b) of the prior art in the vicinity of window areas provided with effect pigment coatings on the underside of the plates.

The layer thickness of the burned-in display paint GPP 010106 is 170±20 nm (FIG. 3).

The light permeability and the operation of the capacitive touch sensor in the region coated with the black coating (display area) were tested with a touch control unit from E.G.O.

Figure 5:
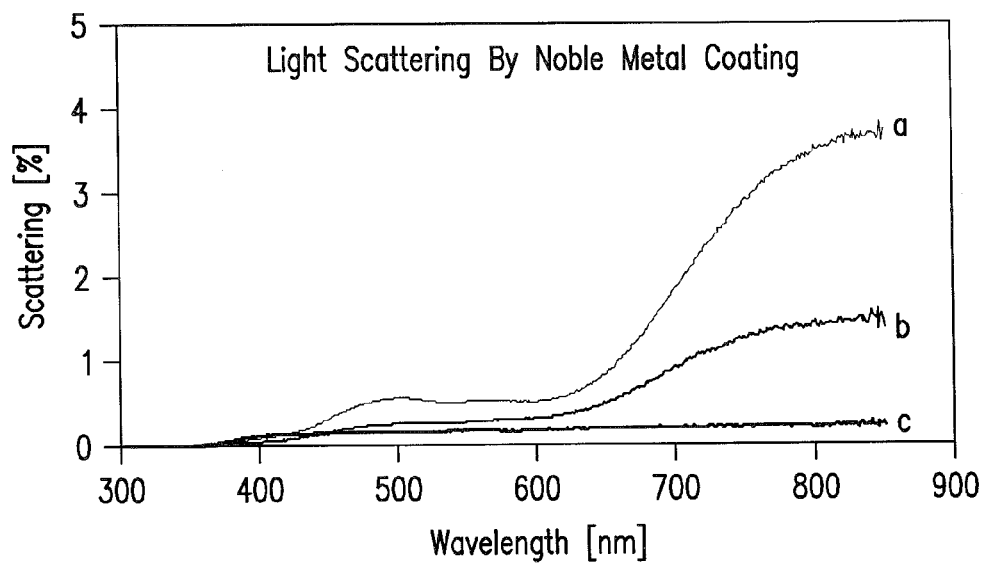
FIG. 5 is a graphical illustration showing the wavelength dependencies of respective fractions of light scattered by corresponding glass ceramic plates (a), (b) and (c) in the vicinity of window areas provided with noble metal coatings of the prior art in the case of glass ceramic plates (a) and (b) and with a noble metal coating of the invention in the case of glass ceramic plate (c)

The display device was sufficiently bright and had sharp edges, i.e. the displayed information was not blurry, and the light scattered by the coated glass ceramic amounted to only 0.2 to 0.3%. FIG. 5 shows the dependence of the light scattering on wavelength for the coating according to the invention (curve c) in the window area in comparison to the wavelength dependence of the light scattering from corresponding prior art coatings of two currently available commercial products. The scattering of these known coated glass ceramic plates, which are given by curves a and b in FIG. 5, is clearly up to 3%, which is much higher than the scattering obtained from the above-described exemplary embodiment of the coated glass ceramic plate according to the invention (curve c). FIG. 3 shows a photograph of the structure of the coating, in which crystallites with a size of at most 130 nm are detectable.

The roughness of the glass ceramic plate surface is only $R_a = 0.2$ μm. Extreme depressions, which occur in the known current glass ceramic plate, do not occur. The glass ceramic surface has maximum known relevant depressions of 0.5 μm. The display was free of dark spots or regions (FIG. 6b).

Figure 7:
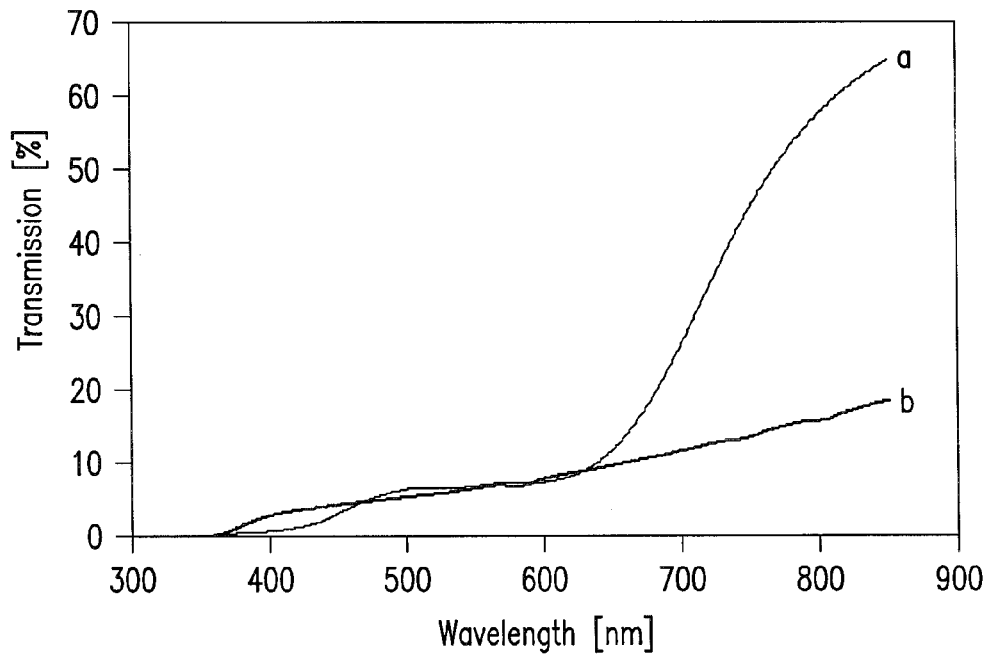
FIG. 7 is a graphical illustration of the wavelength-dependent behavior of the transmission in the display area (a) of a commercially obtained glass ceramic plate providing a cooking surface and in the display area (b) of a glass ceramic plate of the present invention with a noble metal preparation GPP 010106 according to FIG. 3 applied to the underside of the glass ceramic plate and burned-in to the glass ceramic plate.

The transmission of the black-coated glass ceramic plate according to the invention is 2.8% for violet light of wavelength 400 nm and 13.5% for red light of wavelength 750 nm. The transmission for red light was also clearly less than the 42 to 45% for the relevant known cook tops, while the transmission for violet light was clearly higher than that of the relevant known cook tops, which is only 0.5 to 0.6%. FIG. 7 shows the associated transmission curves. The coating GPP 010106 is thus better suitable for multicolored display devices than the coating of the known cook tops.

The cooking zones could be controlled without problems and the heating stages could be selected with the help of the capacitive touch sensors, which were arranged under the display window like the display device in the display area. The electrical surface resistance is 20±2 GΩ/□.

Cleaning (with a paper towel) does not reduce the electrical resistance of the coating.

The scratch resistance of the coating was very good. No scratches that were detectable from above the cooking surface in the built-in state were produced with a rounded metal tip with a curvature radius of 0.5 mm, which was loaded with 400 g.

The evaluation of the opacity occurred in the built-in state with lighting that was relevant to the practical application (range hood DET 77 with integrated light from NEF) from a distance of 85 cm in the assembled cook top. Observation of the interior of the range was not possible (cables, platinum were not observable).

While the invention has been illustrated and described as embodied in a cook top with a glass ceramic plate providing a cooking surface, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A cook top for a cooking device, said cook top comprising a colorless transparent glass ceramic plate with a cooking surface on a top side thereof, said glass ceramic plate being provided with an opaque coating extending over an underside thereof, except that in at least one window area a window coating is provided on the underside of the glass ceramic plate in place of the opaque coating;
    in which the window coating comprises a burned-in noble metal preparation containing at least one noble metal and more than 15 wt. % of at least one oxide, in relation to a total amount of the burned-in noble metal preparation; and
    wherein said at least one noble metal is selected from the group consisting of gold, platinum, palladium, alloys of gold, alloys of platinum and alloys of palladium, and wherein said at least one oxide is selected from the group consisting of base metal oxides and metalloid oxides; and
    wherein the window coating has an electrical surface resistance over 1 MΩ/□ and in the at least one window area the glass ceramic plate coated with the window coating has a transmission in a range from 1.0 to 21.0% for visible light with wavelengths of from 400 nm to 750 nm and a light scattering in a range from 0.0 to 1.0% for said visible light with said wavelengths of from 400 nm to 750 nm.

2. The cook top as defined in claim 1, in which the glass ceramic plate with the window coating has a transmission in the at least one window area for violet light with a wavelength of 400 nm in a range of from 1.4 to 7.0%.

3. The cook top as defined in claim 1, in which the glass ceramic plate with the window coating has a transmission in the at least one window area for red light with a wavelength of 750 nm in a range of from 7.0 to 14.0%.

4. The cook top as defined in claim 1, in which the glass ceramic plate with the window coating scatters from 0.1 to 0.5% of said visible light incident on the at least one window area.

5. The cook top as defined in claim 1, in which the glass ceramic plate with the window coating scatters from 0.2 to 0.3% of said visible light incident on the at least one window area.

6. The cook top as defined in claim 1, in which the window coating on the glass ceramic plate has a surface resistance of around $1\times10^6$ to $100\cdot10^9$ Ohm/□.

7. The cook top as defined in claim 6, in which the surface resistance is from 1 to 20 gigaohm/square.

8. The cook top as defined in claim 1, in which the window coating has a thickness ≦250 nm.

9. The cook top as defined in claim 8, in which said thickness is in a range of from 150 nm to 200 nm.

10. The cook top as defined in claim 1, in which said burned-in noble metal preparation comprises at least two oxides of base metals or at least two oxides of metalloids.

11. The cook top as defined in claim 10, in which said window coating comprises an oxide of at least one element selected from the group consisting of silicon, bismuth, nickel, iron, chromium, zirconium, aluminum, antimony, barium, boron, calcium, cerium, cobalt, germanium, tantalum, tin, titanium, vanadium, manganese, strontium, molybdenum, ruthenium, indium, tungsten, osmium, iridium, rhodium and zinc.

12. The cook top as defined in claim 10, in which said window coating comprises iron oxide and titanium dioxide in respective amounts less than 1.0% by weight, in relation to a total amount of said window coating.

13. The cook top as defined in claim 10, in which said window coating comprises at least one of silicon dioxide and bismuth oxide.

14. The cook top as defined in claim 10, in which said window coating comprises more than 15% by weight of said at least two oxides, in relation to a total amount of said window coating.

15. The cook top as defined in claim 10, in which said window coating comprises from 20 to 40% by weight of said at least one oxide, in relation to a total amount of said window coating.

16. The cook top as defined in claim 1, in which at least one of both surfaces of said glass ceramic plate in the at least one window area has a roughness value $R_a \leqq 0.3$ μm.

17. The cook top as defined in claim 1, in which only the underside of the glass ceramic plate has a roughness value $R_a \leqq 0.3$ μm.

18. The cook top as defined in claim 1, in which the glass ceramic plate has surfaces provided with depressions that have a depth of at most 1 μm.

19. The cook top as defined in claim 18, in which said depth is at most 0.5 μm.

20. The cook top as defined in claim 1, in which the window coating comprises from 40 to 60% by weight gold, from 10 to 20% by weight platinum, from 5 to 20% by weight silicon dioxide, from 5 to 20% by weight bismuth oxide, from 0 to 10% by weight nickel oxide, from 0 to 10% by weight chromium oxide and from 0 to 10% by weight zirconium oxide.

21. The cook top as defined in claim 20, in which the window coating is 170±20 nm thick and has a surface resistance of around $1\times10^6$ to $100\cdot10^9$ Ohm/□.

22. The cook top as defined in claim 20, in which both surfaces of said glass ceramic plate in the at least one window area have a roughness value $R_a \leqq 0.3$ μm.

* * * * *